United States Patent [19]

Landmeier

[11] Patent Number: 4,806,707
[45] Date of Patent: Feb. 21, 1989

[54] 3-DIMENSIONAL DIGITIZER PEN

[75] Inventor: Waldo L. Landmeier, Scottsdale, Ariz.

[73] Assignee: Calcomp Inc., Anaheim, Calif.

[21] Appl. No.: 155,500

[22] Filed: Feb. 12, 1988

[51] Int. Cl.$^4$ ............................................. G08C 21/00
[52] U.S. Cl. ....................................... 178/18; 250/561
[58] Field of Search .................... 178/18, 19; 250/205, 250/215, 230, 561

[56]   References Cited
U.S. PATENT DOCUMENTS 4,263,592  4/1981  Takahashi et al. ................ 178/18 X Primary Examiner—Stafford D. Schreyer
Attorney, Agent, or Firm—Donald A. Streck; Wm F. Porter, Jr.

[57]   ABSTRACT

An electronic pen for a digitizer capable of providing signals to a computer for pen movement in three dimensions relative to a planar tablet. There is a hollow, pen-shaped body member having a writing tip end. A sensing coil is disposed in the body member adjacent the writing tip end and having wires thereof connectable to the computer for use in developing X- and Y-axis positional signals relative to movement of the writing tip end over the surface of the tablet. A pen member is disposed in the body member for longitudinal slidable movement within the body member. The pen member has a writing tip passing out through the body member at the writing tip end and an opposite inner end. Finally, there is a linear position transducer disposed within the body member for producing on output wires therefrom connected to the computer Z-axis positional signals relative to the pressing of the writing tip end against the surface of the tablet. In the preferred embodiment, the linear position transducer comprises, a source of a light beam; an opto-sensor for developing a signal at an output thereof proportional to light impinging on an input surface thereof; and, a reflector operably connected to the inner end of the pen member for reflecting the light beam onto the input surface proportionally to the linear position of the pen member within the body member. Provision is also made for outputting the Z-axis signal as a series of equal steps throughout an initialized range of motion/pressure.

19 Claims, 5 Drawing Sheets

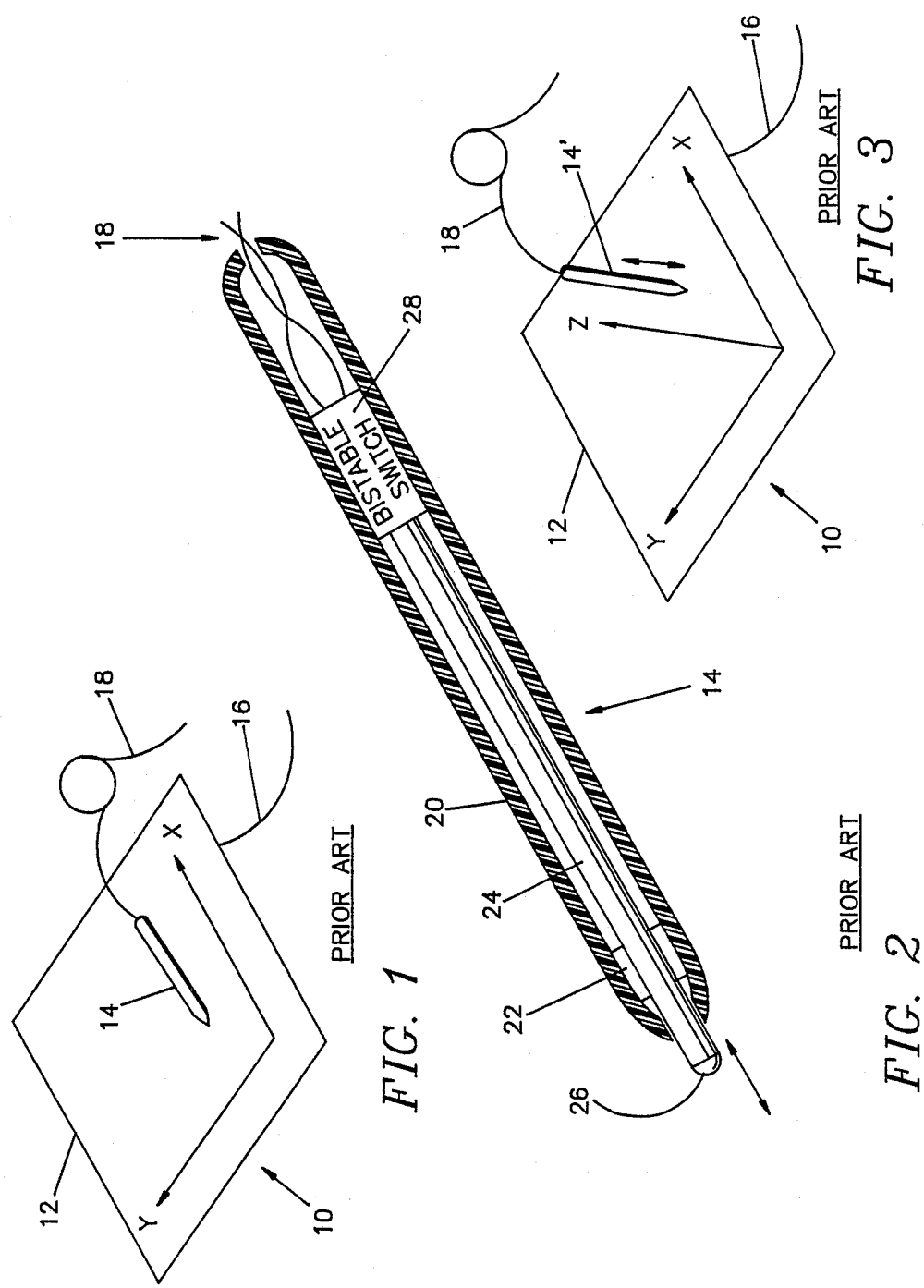

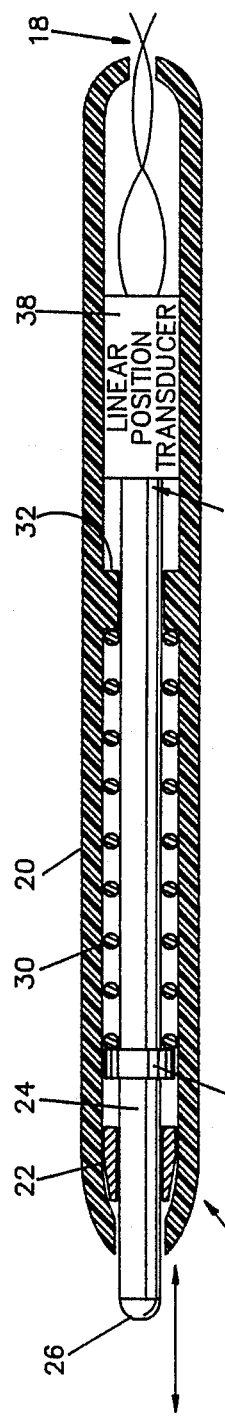
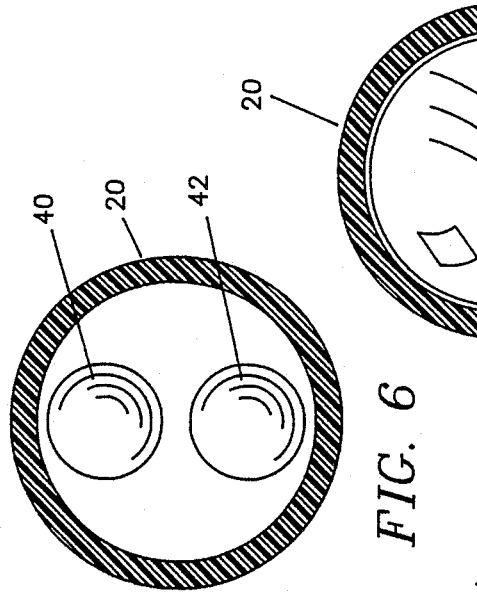
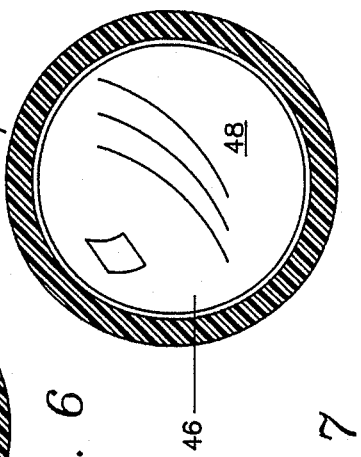
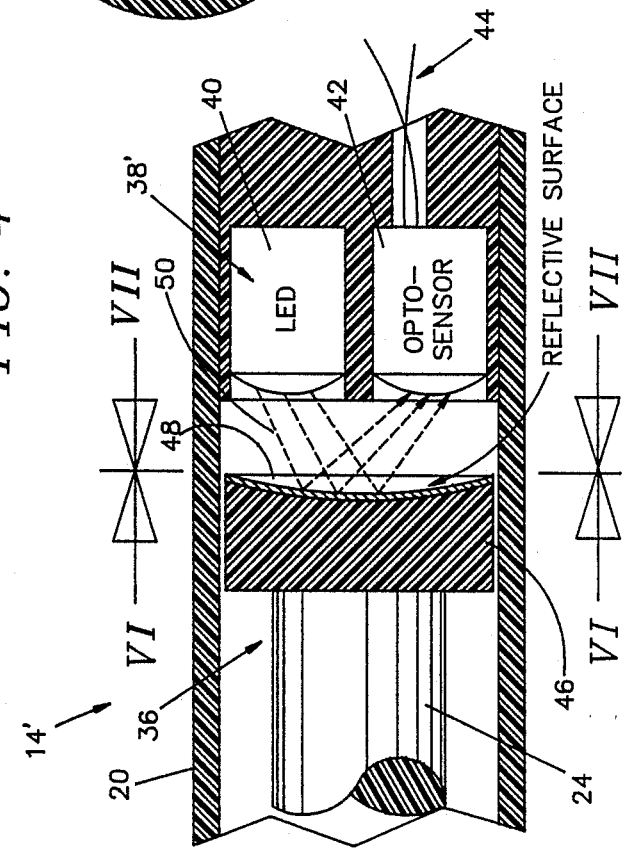

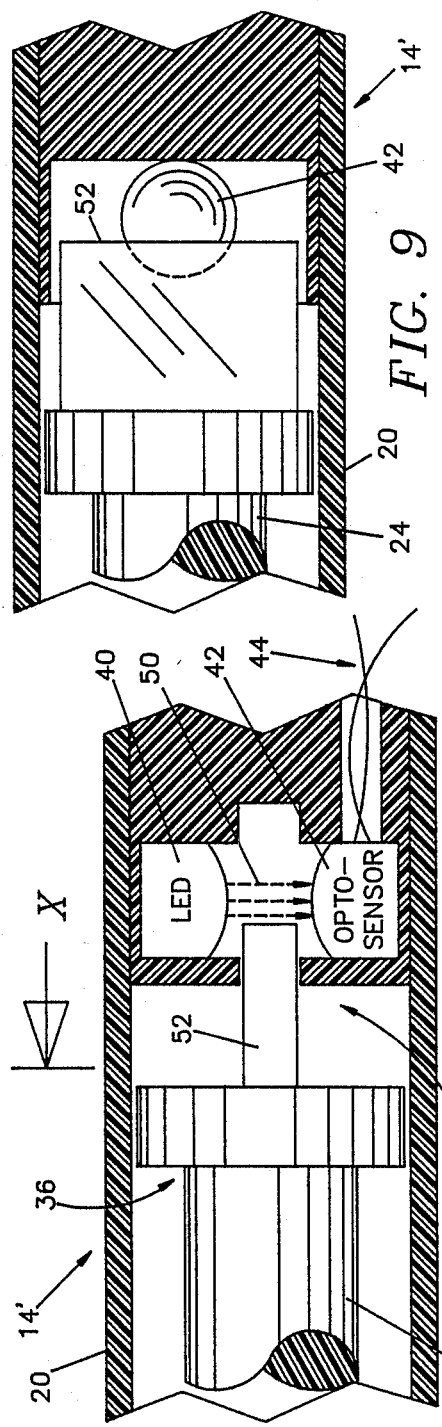
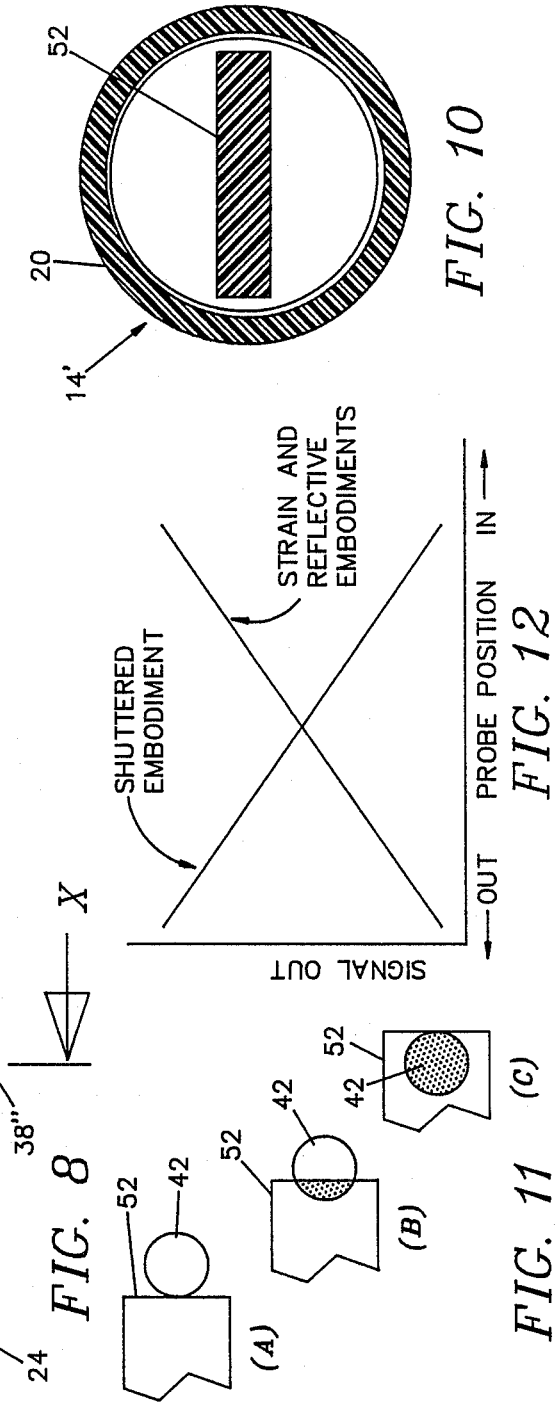

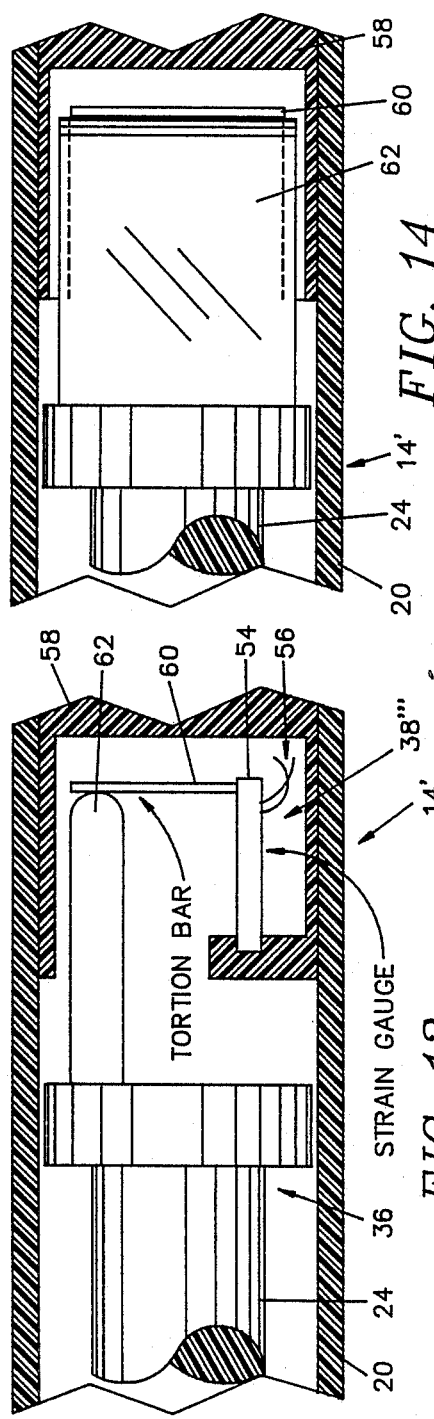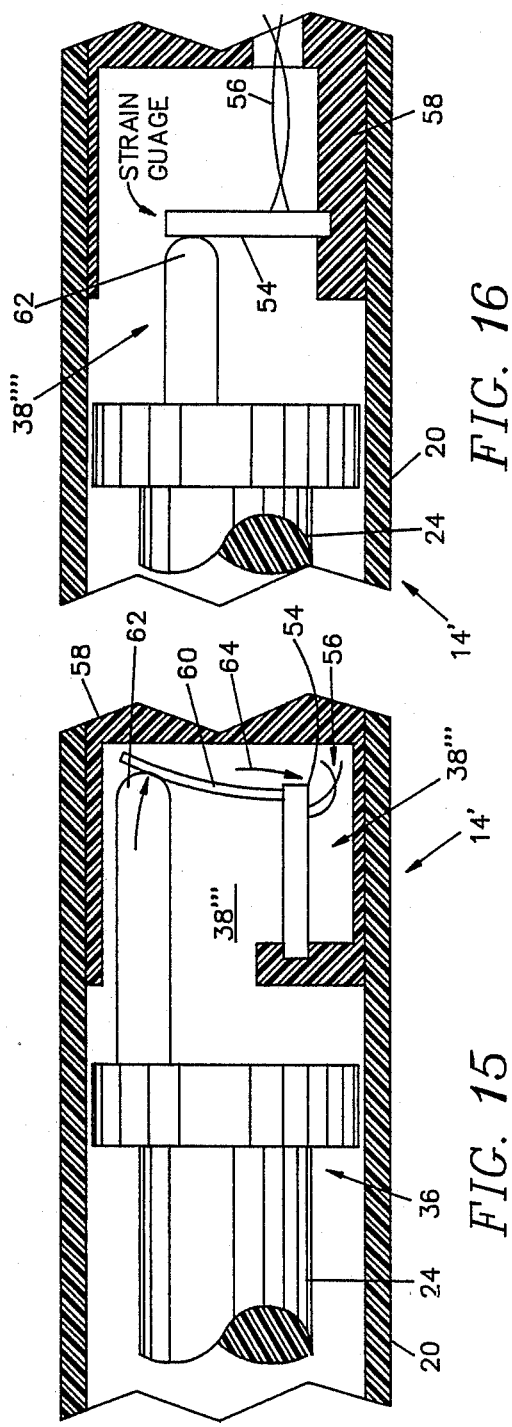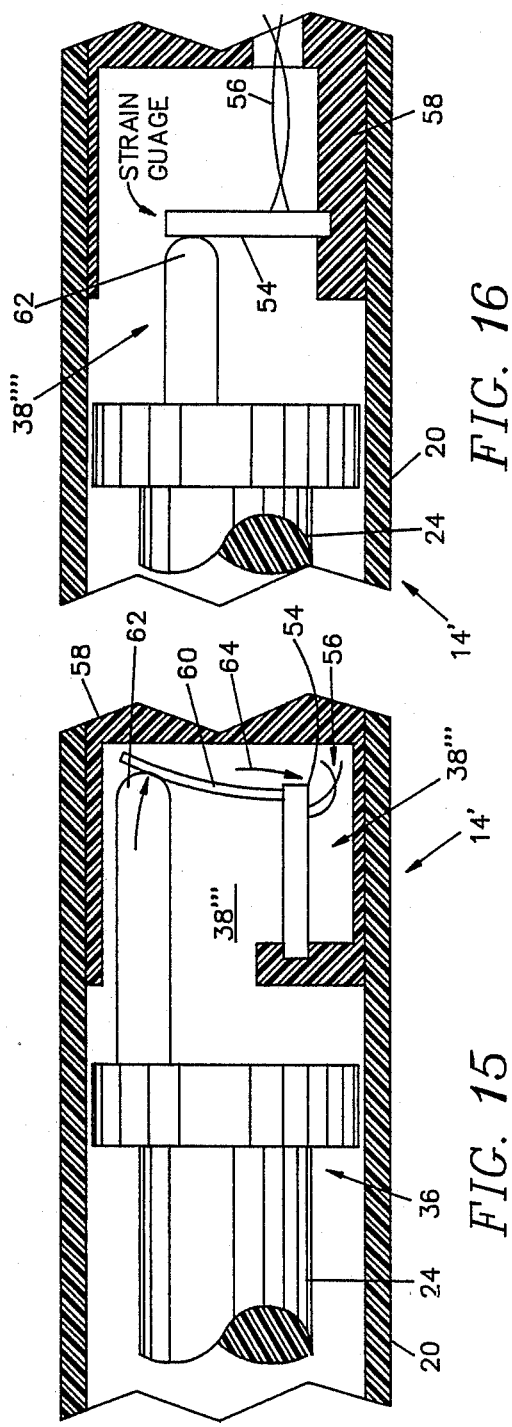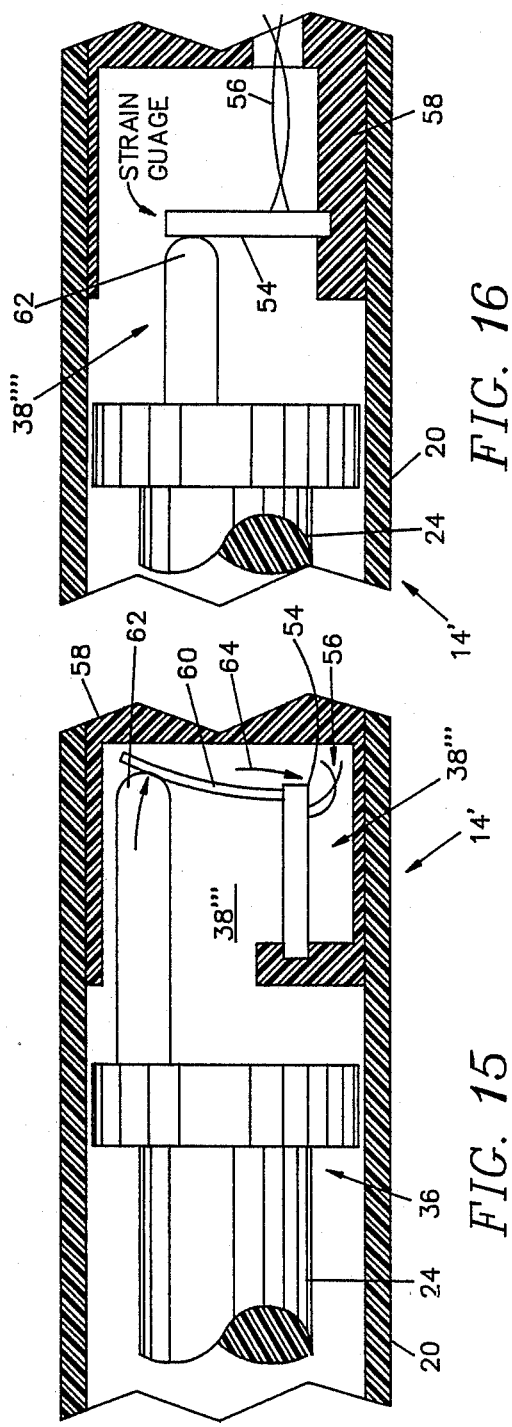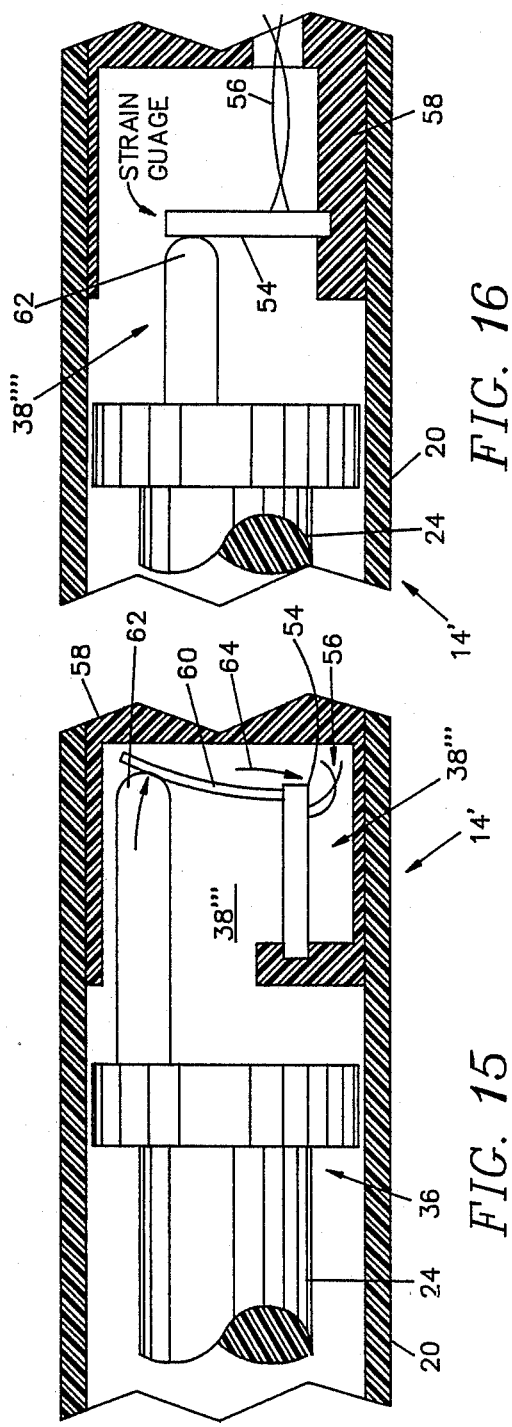

3-DIMENSIONAL DIGITIZER PEN

BACKGROUND OF THE INVENTION

The present invention relates to digitizing tablets, and the like, and, more particularly, to an electronic pen for a digitizer capable of providing signals to a computer for pen movement in three dimensions relative to a planar tablet comprising, a hollow, pen-shaped body member having a writing tip end; sensing means disposed in the body member adjacent the writing tip end and having wires thereof connectable to the computer for use in developing X- and Y-axis positional signals relative to movement of the writing tip end over the surface of the tablet; a pen member disposed in the body member for longitudinal slidable movement within the body member, the pen member having a writing tip passing out through the body member at the writing tip end and an opposite inner end; linear position transducer means disposed within the body member for producing on output wires therefrom connected to the computer Z-axis positional signals relative to the pressing of the writing tip end against the surface of the tablet; means for indicating a first Z-axis positional signal as the starting point of a range of movement; and, means for indicating a second Z-axis positional signal as the ending point of a range of movement.

Digitizing systems are gaining popularity in the computer art as a means of inputting positional data to a computer, or the like. While digitizing systems were originally large and expensive, as were the computers with which they were used, many smaller and inexpensive digitizing systems are now available for use with the smaller "personal computers" that are available for both home and business use. Of these digitizing systems, the digitizing tablet is, probably, the most popular. As depicted in FIG. 1, a basic digitizing tablet system, such as that generally indicated as 10, comprises a tablet 12 and an electronic pen 14. Both the tablet 12 and the pen 14 are connected to the computer (not shown) by wires 16 and 18, respectively. For simplicity, only two wires are shown with respect to 16 and 18 in each case. This is representative only and more wires are probably actually interconnected to the computer, depending on the type of system being implemented and the features provided.

As shown in FIG. 2, the pen 14 for such a 2-dimensional system typically comprises a hollow, plastic, cylindrical, body 20 with a coil 22 disposed adjacent the "writing" end of the body 20 and connected to the wires 18. As the pen 14 is moved over the surface of the tablet 12, the 2-dimensional X,Y coordinates of its position are provided to the computer over the wires 16, 18 by electronic means involving the coil 22 which are not important to the present invention and, therefore, omitted in the interest of simplicity. To provide the user with a means of signaling the computer when the writing tip of the pen 14 is at a desired coordinate point, a switch is normally provided on the pen 14 and connected to the wires 18. Sometimes, the switch is mounted to be activated by finger pressure. More often, however, the construction is a shown in FIG. 2 wherein there is a longitudinally slidable, plastic, pen member 24 having a "writing tip" 26 which passes through the coil 22 and extends out of the pen body 20. At a desired point, the pen body 20 is pressed towards the surface of the tablet 12 causing the pen member 24 to move longitudinally into the pen body 20 and activate the bistable switch 28 disposed therein. When the longitudinal inward pressure on the pen member 24 is released, the switch 28 returns to its normal position. For those interested, attention is directed to U.S. Pat. No. 4,532,376 entitled ELECTRONIC PEN WITH SWITCHING MECHANISM FOR SELECTIVELY PROVIDING TACTILE OR NON-TACTILE FEEL by Lynn H. Rockwell and assigned to the common assignee of this application. A more detailed description of the construction of an electronic pen for 2-dimensional digitizing as described above is provided therein.

As depicted by the drawing of FIG. 3, there are instances in the prior art where signals related to three dimensions are desirable; that is, the providing of a signal related to the amount of longitudinal pressure on the pen member 24 in addition to its X,Y position on the surface of the tablet 12. For example, when using so-called "painting" software, area color or shading can be dynamically set through sensing the pressure on the pen member 24 as a function of its longitudinal displacement. To date, prior art attempts at providing an electronic pen capable of providing a signal in the Z-axis (i.e. generally perpendicular to the tablet) have been limited to complex electronic detection of the longitudinal movement of the pen member 24. Such a prior art approach is shown in simplified form in FIG. 4 wherein the pen 14' is shown in a general form. Again, there is a hollow body 20 having an annular coil 22 and a longitudinally sliding pen member 24 with its writing tip 26 passing through the coil 22 and extending out of the body 20. The pen member 24 is biased to its most extended position by a coil spring 30 disposed between an inner ridge 32 within the body 20 and a collar 34 on the pen member 24. The inner end 36 of the pen member 24 is disposed to interact with a linear position transducer 38 which is operably connected to provide a sensible signal to the computer (not shown) over the wires 18. In one prior art system, the linear position transducer 38 comprises a magnet carried by the pen member 24 and used to modify the characteristics of a transistor as a function of proximity through the use of the so-called Hall effect. In another prior art system, annular coils are disposed within the body of the pen body 20 and a core is carried by the end of the pen member 24 to move through the coils and, thereby, modify their electronic characteristics. As can be appreciated, both these prior art methods are complex and difficult to build into a pen and in their operation. Typically, a special pen body must be constructed to accept all the components required to provide the Z-axis signal according to these prior art techniques.

Wherefore, it is the object of the present invention to provide an electronic pen for use with digitizing tablets, and the like, providing not only X,Y positional signal inputs; but, additionally, a Z-axis signal reflecting pressure on a longitudinally movable pen member or, alternatively, longitudinal displacement of the pen member wherein the sensing apparatus developing the Z-axis signal is simple to operate and interface with and is simple and easy to incorporate into a standard electronic pen body.

Other objects and benefits of the present invention will become apparent from the description which follows hereinafter when taken in conjunction with the drawing figures which accompany it.

SUMMARY

The objects of the present invention have been achieved in the electronic pen for a digitizer of the present invention which is capable of providing signals to a computer for pen movement in three dimensions relative to a planar tablet and comprises, a hollow, pen-shaped body member having a writing tip end; sensing means disposed in the body member adjacent the writing tip end and having wires thereof connectable to the computer for use in developing X- and Y-axis positional signals relative to movement of the writing tip end over the surface of the tablet; a pen member disposed in the body member for longitudinal slidable movement within the body member, the pen member having a writing tip passing out through the body member at the writing tip end and an opposite inner end; transducer means disposed within the body member for producing on output wires therefrom connected to the computer Z-axis positional signals relative to the pressing of the writing tip end against the surface of the tablet; means for indicating a first Z-axis positional signal as the starting point of a range of movement; and, means for indicating a second Z-axis positional signal as the ending point of a range of movement. In one general embodiment, the linear position transducer means includes means for producing the Z-axis signals as a function of longitudinal pressure against the pen member created by the pressing of the writing tip end against the tablet while in another, it includes means for producing the Z-axis positional signals as a function of longitudinal movement of the pen member created by pressing the writing tip end against the tablet.

In the preferred embodiment, there is also first logic means for calculating the range of movement as the starting point subtracted from the ending point and second logic means for calculating a plurality of steps to be recognized in the Z-axis as the range of movement divided by the number of the steps.

In the preferred embodiment, the transducer means comprises, a source of a light beam; opto-sensor means for developing a signal at an output thereof proportional to light impinging on an input surface thereof; and, reflector means operably connected to the inner end of the pen member for reflecting the light beam onto the input surface proportionally to the linear position of the pen member within the body member.

In an alternate embodiment, the transducer means comprises, opto-sensor means for developing a signal at an output thereof proportional to light impinging on an input surface thereof; a source of a light beam disposed to direct the light beam onto the input surface; and, shutter means operably connected to the inner end of the pen member for blocking the light beam proportionally to the linear position of the pen member within the body member.

In yet another embodiment, the transducer means comprises strain gauge means mounted to the body member on one end and having a free opposite end for developing a signal at an output thereof in response to bending forces applied to the free end and pushing means operably connected to the inner end of the pen member for applying a bending force to the free end proportional to longitudinal forces on the pen member.

DESCRIPTION OF THE DRAWINGS

FIG. 1 is a simplified perspective drawing of a digitizing tablet system according to the prior art for digitizing in two dimensions.

FIG. 2 is a simplified, partially cut-away side view drawing of an electronic pen according to the prior art for use in the digitizing system of FIG. 1.

FIG. 3 is a simplified perspective drawing of a prior art digitizing tablet system in the manner of FIG. 1 for digitizing in three dimensions as wherein the pen of the present invention is useful.

FIG. 4 is a simplified, partially cut-away side view drawing of an electronic pen according to the prior art for use in the digitizing system of FIG. 3.

FIG. 5 is an enlarged, detailed, partially cut-away side view of the pen of FIG. 4 in the area of the linear position transducer showing the preferred construction of the present invention for producing a Z-axis movement signal.

FIG. 6 is an enlarged, detailed, partially cut-away view through the pen of FIG. 5 in the plane VI—VI.

FIG. 7 is an enlarged, detailed, partially cut-away view through the pen of FIG. 5 in the plane VII—VII.

FIG. 8 is an enlarged, detailed, partially cut-away side view of the pen of FIG. 4 in the area of the linear position transducer employed therein showing a first alternate embodiment for producing a Z-axis movement signal.

FIG. 9 is an enlarged, detailed, partially cut-away top view through the pen of FIG. 8 at 90° from the view of FIG. 8.

FIG. 10 is an enlarged, detailed, partially cut-away view through the pen of FIG. 8 in the plane X—X.

FIGS. 11(A)–(C) are simplified drawings depicting the shutter effect which takes place in the embodiment of FIGS. 8–10.

FIG. 12 is a graph depicting the transducer signals out of the various embodiments of the present invention.

FIG. 13 is an enlarged, detailed, partially cut-away side view of the pen of FIG. 4 in the area of the linear position transducer employed therein showing a second alternate embodiment for producing a Z-axis movement signal.

FIG. 14 is an enlarged, detailed, partially cut-away top view through the pen of FIG. 13 at 90° from the view of FIG. 13.

FIG. 15 is the drawing of FIG. 13 with the pen depressed to create a force on the strain gauge employed therein to create the signal for the Z-axis.

FIG. 16 is an enlarged, detailed, partially cut-away side view of the embodiment of FIG. 13 showing an alternate method of mounting the strain gauge.

DESCRIPTION OF THE PREFERRED AND ALTERNATE EMBODIMENTS

Figure 17:
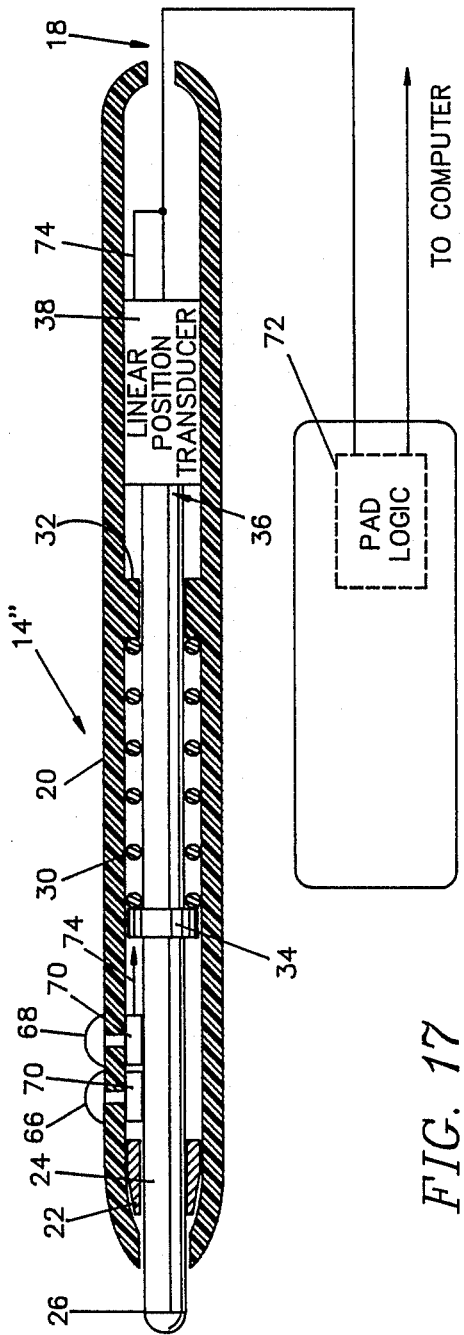
FIG. 17 is a cutaway drawing of a pen according to the present invention provided with provision for calibrating the range of movement/pressure thereof.

The electronic pen of the present invention is generally indicated as 14' in the various figures. For convenience and comparison purposes, like components to the prior art pens described above are designated with like numbers. The modifications to implement the present invention will be related to the simplified drawing of FIG. 4 and the components thereof. As with the prior art, the inner end 36 of the pen member 24 is disposed to interact with a linear position transducer 38 which is operably connected to provide a sensible signal to the computer (not shown) over the wires 18. As will now be described in detail, there are several possible embodiments of the pen member's inner end 36 and transducer 38 to be included within the scope and spirit of the present invention.

Turning first to FIGS. 5-7, the present invention is shown in its preferred embodiment. In this embodiment, the linear position transducer 38' comprises a light source such as a light emitting diode (LED) 40 in combination with an opto-sensor 42 of a type well known in the art which develops an output signal on wires 44 as a function of the amount of light striking it. In a commercial embodiment manufactured by the assignee of this application, the linear position transducer 38' is made from the components of an optic reflective switch sold by TRW, Inc. as part number OPB706A. To vary the amount of light from the LED 40 striking the opto-sensor 42 as a function of the linear displacement of the pen member 24, the inner end 36 is provided with a reflector member 46 having a reflective surface 48 shaped to reflect light 50 from the LED 40 back onto the opto-sensor 42. The amount of reflected light 50 (and, therefore, the signal level on wires 44) is directly proportional to the proximity of the reflector member 46 to the LED 40 and opto-sensor 42; that is, the closer the reflector member 46 is to the LED 40 and opto-sensor 42, the stronger the signal out of the opto-sensor 42 on wires 44. This is depicted in the graph of FIG. 12.

A variation of this approach employing the same components in the linear position transducer 38" is shown in alternate embodiment of FIGS. 8-11. In this embodiment, the LED 40 and opto-sensor 42 are disposed opposite and spaced from one another. The inner end 36 of the pen member 24 is provided with a shutter member 52 which slides between the LED 40 and opto-sensor 42 as the pen member 24 slides longitudinally in and out. The result is shown in simplified form in FIGS. 11(A)-11(C) and the signal out on the wires 44 is shown in the graph of FIG. 12. As can be seen, as the pen member 24 slides longitudinally in, the shutter member 52 progressively cuts off the path for light 50 between the LED 40 and the opto-sensor 42. As a result, the signal out on wires 44 is opposite to that of the prior embodiment; that is, the further into the body 20 the pen member 24 moves, the weaker the signal out of the opto-sensor 42 on wires 44. Actually, the direction of movement of the signal out of the transducer 38 in the various embodiments is unimportant to the computer. All that is required is a relatively linear signal proportional to the longitudinal movement of the pen member 24.

A non-light based embodiment requiring minimal actual movement of the pen member 24 is shown in FIGS. 13-16. This embodiment is more pressure sensitive than movement sensitive as were the previous embodiments. In this embodiment, the transducer 38''' is in the form of a strain gauge 54 generally of a type also well known to those skilled in the art. The strain gauge 54 is of a type which outputs a signal on wires 56 as a function of the bending force applied to it. For this purpose, the strain gauge 54 is cantilevered parallel to the longitudinal axis of the body 20 by mounting it on one end to a plug 58 disposed in the body 20. The other end is provided with a torsion bar 60 against which a push bar 62 extending from the inner end 36 of the pen member 24 pushes as inward longitudinal pressure is exerted against the writing tip 26 of the pen member 24. The torsion bar 60 is deflected by the force as shown in FIG. 15, which results in a bending force on the strain gauge 54, as indicated by the arrow 64, which, in turn, produces the desired signal on the wires 56. Alternatively, the strain gauge 54 can be mounted transverse to the longitudinal axis of the body 20 as shown in FIG. 16 with the push bar 62 pressing directly against its other (free) end. This latter method of mounting, of course, is totally pressure sensitive as there is virtually no longitudinal movement of the pen member 24 involved whereas with the prior method of mounting and the intermediate disposition of the torsion bar 60, there is more "feel" to the movement of the pen 14 as it is pushed against and released from the tablet 12 as is the case with the light-based embodiments described above.

Turning now to FIG. 17, a further refinement to the electronic pen of the present invention in its preferred embodiment will now be described. Regardless of the type of sensor employed for the linear transducer which develops the Z-axis signal, it is preferred that the beginning and end points of the travel of or pressure on the pen member 24 be individually settable under operator control and that, additionally, the range of signal developed between the beginning and end points be divided into a plurality of discrete, equal steps. In the preferred embodiment as incorporated into the commercial embodiment of the present invention as is to be sold by the assignee of this application in the future, the range is divided into 256 steps. This is because, unlike the X- and Y-axis positions which are virtually continuous in nature (i.e. the greater the resolution possible the better), the Z-axis is typically employed to choose between a plurality of step choices such as color or hue. That is, for example, most computers where color is available provide a plurality of distinct colors to choose from rather than a sliding scale of ever-changing, rainbow-like colors.

Figure 18:
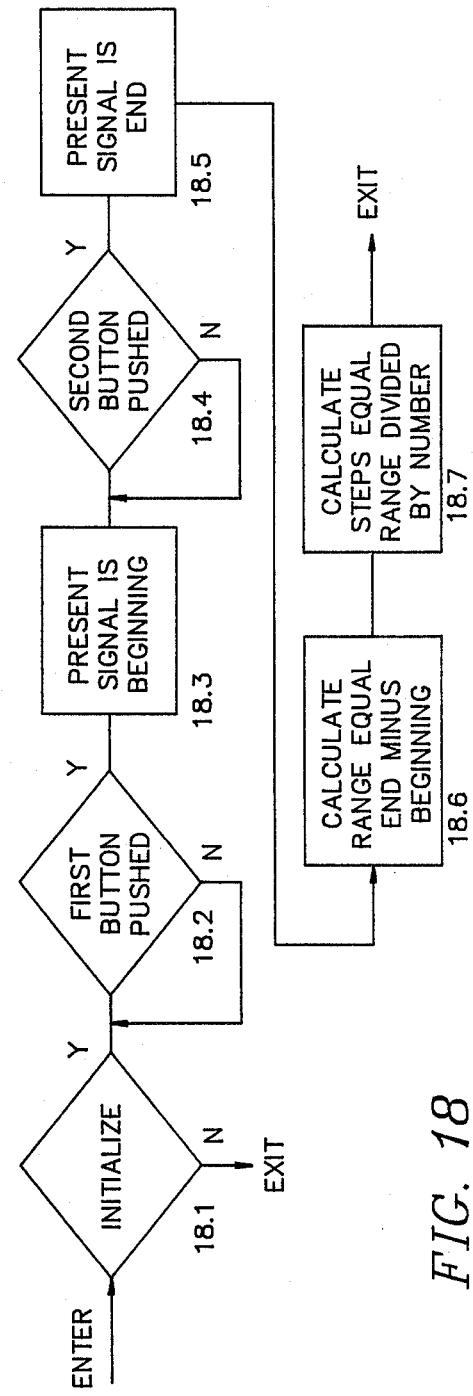
FIG. 18 is a flowchart of logic employed with the pen embodiment of FIG. 17 to provide step outputs in the Z-axis signal.

As depicted in FIG. 17, the preferred pen is provided with buttons 66, 68 used to manually activate switches 70. The pad logic 72 is adapted to sense the switches 70 on lines 74 therefrom in combination with the Z-axis signal from the linear position transducer 38 in the manner shown in the logic flowchart of FIG. 18. The logic of FIG. 18 is simplified logic showing the general steps employed and, as those skilled in the art will recognize, in the interest of simplicity does not show all the steps which would be required to actually implement the procedure. When the logic determines at block 18.1 that it is in an initialization procedure, it first waits at block 18.2 until the first button 66 is pushed. At that time the present signal value from the linear position transducer 38 is saved at block 18.3 as the beginning level of signal for the range of movement/pressure. The logic then waits at block 18.4 until the second button 68 is pushed. At that time the present signal value from the linear position transducer 38 is saved at block 18.5 as the ending level of signal for the range of movement/pressure. The range of movement/pressure is then calculated at block 18.6 by subtracting the beginning signal from the ending signal. Finally, the size of each step is calculated at block 18.7 by dividing the range by the number of steps to be employed. Thereafter, when inputting the Z-axis signal, the pad logic 72 provides a step signal for all Z-axis signals (rather than the actual signal) reflecting the step of the total range within which the signal is presently.

Wherefore, having thus described the present invention, what is claimed is:

1. An electronic pen for a digitizer capable of providing signals to a computer for pen movement in three dimensions relative to a planar tablet comprising:
   (a) a hollow, pen-shaped body member having a writing tip end;
   (b) sensing means disposed in said body member adjacent said writing tip end and having wires thereof connectable to the computer for use in developing X- and Y-axis positional signals relative to movement of said writing tip end over the surface of the tablet;
   (c) a pen member disposed in said body member for longitudinal slidable movement within said body member, said pen member having a writing tip passing out through said body member at said writing tip end and an opposite inner end;
   (d) transducer means disposed within said body member for producing on output wires therefrom connected to the computer continuous Z-axis positional signals directly related to the pressing of said writing tip end against the surface of the tablet;
   (e) means for indicating a first Z-axis positional signal as the starting point of a range of movement and said continuous Z-axis positional signals; and,
   (f) means for indicating a second Z-axis positional signal as the ending point of a range of movement and said continuous Z-axis positional signals.

2. The electronic pen of claim 1 wherein:
   said transducer means includes means for producing said Z-axis positional signals as a function of longitudinal movement of said pen member created by pressing said writing tip end against the tablet.

3. The electronic pen of claim 1 and additionally comprising:
   (a) first logic means for calculating said range of movement as said starting point subtracted from said ending point; and,
   (b) second logic means for calculating a plurality of steps to be recognized in the Z-axis as said range of movement divided by the number of said steps.

4. The electronic pen of claim 1 wherein said transducer means comprises:
   (a) a source of a light beam;
   (b) opto-sensor means for developing a signal at an output thereof proportional to light impinging on an input surface thereof; and,
   (c) reflector means operably connected to said inner end of said pen member for reflecting said light beam onto said input surface proportionally to the linear position of said pen member within said body member.

5. The electronic pen of claim 4 wherein:
   said reflector means comprises a reflector member having a reflective surface carried by said inner end.

6. The electronic pen of claim 5 wherein:
   (a) said source of a light beam and said opto-sensor means are disposed side by side in a bulkhead within said body member with said light beam directed longitudinally down said body member towards said inner end of said pen member; and,
   (b) said reflector member is mounted on the end of said inner end with said reflective surface perpendicular to said bulkhead.

7. The electronic pen of claim 1 wherein said transducer means comprises:
   (a) opto-sensor means for developing a signal at an output thereof proportional to light impinging on an input surface thereof;
   (b) a source of a light beam disposed to direct said light beam onto said input surface; and,
   (c) shutter means operably connected to said inner end of said pen member for blocking said light beam proportionally to the linear position of said pen member within said body member whereby said signal at said output is a continuous signal directly related to the linear position of said pen member.

8. The electronic pen of claim 7 wherein:
   said shutter means comprises a shutter member carried by said inner end.

9. The electronic pen of claim 8 wherein:
   (a) said source of a light beam and said opto-sensor means are disposed in parallel spaced relationship within said body member; and,
   (b) said shutter member is mounted on the end of said inner end to slide between said source of a light beam and said opto-sensor means as said pen member moves longitudinally within said body member.

10. In an electronic pen for a digitizer capable of providing signals to a computer having a hollow, pen-shaped body member having a writing tip end; sensing means disposed in the body member adjacent the writing tip end and having wires thereof connectable to the computer for use in developing X- and Y-axis positional signals relative to movement of the writing tip end over the surface of the tablet; and, a pen member disposed in the body member for longitudinal slidable movement within the body member, the pen member having a writing tip passing out through the body member at the writing tip end and an opposite inner end, the improvement for providing for pen movement signals in three dimensions relative to a planar tablet comprising linear position transducer means disposed within the body member for producing on output wires therefrom connected to the computer Z-axis positional signals as a function of longitudinal movement of the pen member created by the pressing of the writing tip end against the surface of the tablet wherein said linear position transducer means comprises:
   (a) a source of a light beam;
   (b) opto-sensor means for developing a signal at an output thereof proportional to light impinging on an input surface thereof; and,
   (c) reflector means operably connected to the inner end of the pen member for reflecting said light beam onto said input surface proportionally to the linear position of the pen member within the body member.

11. The improvement to an electronic pen of claim 10 wherein:
   said reflector means comprises a reflector member having a reflective surface carried by the inner end.

12. The improvement to an electronic pen of claim 11 wherein:
   (a) said source of a light beam and said opto-sensor means are disposed side by side in a bulkhead within the body member with said light beam directed longitudinally down the body member towards the inner end of the pen member; and, (b) said reflector member is mounted on the end of the inner end with said reflective surface perpendicular to said bulkhead.

13. The improvement to an electronic pen of claim 10 and additionally comprising:
   (a) means for indicating a first Z-axis positional signal as the starting point of a range of movement; and,
   (b) means for indicating a second Z-axis positional signal as the ending point of a range of movement.

14. The improvement to an electronic pen of claim 13 and additionally comprising:
   (a) first logic means for calculating said range of movement as said starting point subtracted from said ending point; and,
   (b) second logic means for calculating a plurality of steps to be recognized in the Z-axis as said range of movement divided by the number of said steps.

15. In an electronic pen for a digitizer capable of providing signals to a computer having a hollow, pen-shaped body member having a writing tip end; sensing means disposed in the body member adjacent the writing tip end and having wires thereof connectable to the computer for use in developing X- and Y-axis positional signals relative to movement of the writing tip end over the surface of the tablet; and, a pen member disposed in the body member for longitudinal slidable movement within the body member, the pen member having a writing tip passing out through the body member at the writing tip end and an opposite inner end, the improvement for providing for pen movement signals in three dimensions relative to a planar tablet comprising linear position transducer means disposed within the body member for producing on output wires therefrom connected to the computer continuous Z-axis positional signals as a function of longitudinal movement of the pen member created by the pressing of the writing tip end against the surface of the tablet wherein said linear position transducer means comprises:
   (a) opto-sensor means for developing a signal at an output thereof proportional to light impinging on an input surface thereof;
   (b) a source of a light beam disposed to direct said light beam onto said input surface; and,
   (c) shutter means operably connected to the inner end of the pen member for blocking said light beam proportionally to the linear position of the pen member within the body member whereby said signal at said output is a continuous signal directly related to the linear position of said pen member.

16. The improvement to an electronic pen of claim 15 wherein:
   said shutter means comprises a shutter member carried by the inner end.

17. The improvement to an electronic pen of claim 16 wherein:
   (a) said source of a light beam and said opto-sensor means are disposed in parallel spaced relationship within the body member; and,
   (b) said shutter member is mounted on the end of the inner end to slide between said source of a light beam and said opto-sensor means as the pen member moves longitudinally within the body member.

18. The improvement to an electronic pen of claim 15 and additionally comprising:
   (a) means for indicating a first Z-axis positional signal as the starting point of a range of movement and said continuous Z-axis positional signals; and,
   (b) means for indicating a second Z-axis positional signal as the ending point of a range of movement and said continuous Z-axis positional signals.

19. The improvement to an electronic pen of claim 18 and additionally comprising:
   (a) first logic means for calculating said range of movement as said starting point subtracted from said ending point; and,
   (b) second logic means for calculating a plurality of steps to be recognized in the Z-axis as said range of movement divided by the number of said steps.

* * * * *